United States Patent
Tiainen (10) Patent No.: US 10,308,086 B2
(45) Date of Patent: Jun. 4, 2019

(54) MOVABLE TOW BAR ASSEMBLY

(71) Applicant: TIAINEN PROJECTS PTY LTD., Holland Park West (AU)

(72) Inventor: Richard Tiainen, Holland Park West (AU)

(73) Assignee: TIAINEN PROJECTS PTY LTD., Holland Park West (AU)

( * ) Notice: Subject to any disclaimer, the term of this patent is extended or adjusted under 35 U.S.C. 154(b) by 42 days.

(21) Appl. No.: 15/587,729

(22) Filed: May 5, 2017

(65) Prior Publication Data

US 2017/0240010 A1    Aug. 24, 2017

Related U.S. Application Data

(63) Continuation-in-part of application No. PCT/AU2015/050692, filed on Nov. 5, 2015.

(30) Foreign Application Priority Data

Nov. 7, 2014 (AU) ................................. 2014904485

(51) Int. Cl.
*B60D 1/24* (2006.01)
*B60D 1/44* (2006.01)

(52) U.S. Cl.
CPC ............. *B60D 1/245* (2013.01); *B60D 1/246* (2013.01); *B60D 1/44* (2013.01)

(58) Field of Classification Search
CPC .......... B60D 1/245; B60D 1/246; B60D 1/44
USPC ....................................................... 280/469
See application file for complete search history.

(56) References Cited

U.S. PATENT DOCUMENTS

| | | | | |
|---|---|---|---|---|
| 852,746 A * | 5/1907 | Stevig | ...................... | B60D 1/44 280/469 |
| 1,130,311 A * | 3/1915 | Mast | ....................... | B60D 1/44 280/470 |
| 1,162,946 A * | 12/1915 | Olson | ...................... | B60D 1/44 114/246 |
| 1,235,082 A * | 7/1917 | Brethorst | ................ | B60D 1/44 280/470 |
| 1,362,857 A * | 12/1920 | Engh | ....................... | B60D 1/44 280/470 |

(Continued)

FOREIGN PATENT DOCUMENTS

DE    3318929 A1    11/1984
EP    1163829 A1    12/2001

(Continued)

OTHER PUBLICATIONS

Office Action in Australian Patent Application No. 2017202996 dated Jan. 17 2018.

(Continued)

*Primary Examiner* — Joseph M Rocca
*Assistant Examiner* — Conan D Duda
(74) *Attorney, Agent, or Firm* — Cooper Legal Group, LLC (57) ABSTRACT

A movable tow-bar assembly comprising: an elongate frame configured to be attached to a vehicle; a towing attachment comprising a sleeve that is shaped to receive a section of the elongate frame and allow translation of the towing attachment along a length of the frame; and a driving arrangement coupled with the towing attachment and the frame for effecting translational movement of the towing attachment along the length of the frame.

19 Claims, 9 Drawing Sheets

(56) References Cited

U.S. PATENT DOCUMENTS

| | | | | |
|---|---|---|---|---|
| 1,366,842 A * | 1/1921 | Smith | B60D 1/44 | 172/321 |
| 1,405,916 A * | 2/1922 | Heenan | B62D 13/00 | 280/470 |
| 1,450,526 A * | 4/1923 | Timmis | B62D 13/00 | 280/470 |
| 1,542,581 A * | 6/1925 | Prilipp | B60D 1/44 | 280/467 |
| 1,574,716 A * | 2/1926 | Warren | B60D 1/44 | 280/447 |
| 1,637,854 A * | 8/1927 | Burbach | B60D 1/44 | 280/469 |
| 1,830,874 A * | 11/1931 | Hendrickson | B60D 1/44 | 280/410 |
| 2,025,820 A * | 12/1935 | Miller | B62D 13/00 | 280/447 |
| 2,414,248 A * | 1/1947 | Townsend | B60D 1/44 | 280/447 |
| 2,653,031 A * | 9/1953 | Butler | B60D 1/44 | 280/468 |
| 2,788,226 A * | 4/1957 | Malone | A01B 59/042 | 280/447 |
| 2,890,896 A * | 6/1959 | Hendrickson | B60D 1/44 | 280/467 |
| 2,917,323 A * | 12/1959 | Mandekic | B60D 1/44 | 280/470 |
| 2,947,551 A * | 8/1960 | Reimers | B60D 1/44 | 280/447 |
| 3,172,685 A * | 3/1965 | Mandekic | B62D 13/005 | 280/408 |
| 3,178,203 A * | 4/1965 | Elliott | B62D 13/00 | 280/470 |
| 3,677,565 A * | 7/1972 | Slosiarek | B60D 1/44 | 280/467 |
| 3,891,239 A | 6/1975 | Leo et al. | | |
| 4,019,754 A * | 4/1977 | Hinckley | B60D 1/173 | 280/446.1 |
| 4,060,255 A * | 11/1977 | Zimmerman | B60D 1/44 | 280/478.1 |
| 4,153,132 A | 5/1979 | Biedebach | | |
| 4,159,833 A * | 7/1979 | Meiners | B60D 1/50 | 267/138 |
| 4,214,772 A | 7/1980 | Carr et al. | | |
| 4,929,028 A * | 5/1990 | Underwood | B60D 1/42 | 280/490.1 |
| 4,961,589 A * | 10/1990 | Faurenhoff | B60D 1/44 | 248/352 |
| 5,102,156 A * | 4/1992 | Fink | B60D 1/485 | 280/495 |
| 5,193,837 A * | 3/1993 | Fink | B60D 1/44 | 280/495 |
| 5,511,813 A * | 4/1996 | Kravitz | B60D 1/42 | 280/495 |
| 5,716,066 A * | 2/1998 | Chou | B60D 1/488 | 280/460.1 |
| 6,220,618 B1 * | 4/2001 | Smith | B60D 1/34 | 280/447 |
| 6,443,475 B1 * | 9/2002 | Fegley | B60D 1/44 | 280/463 |
| 6,585,280 B1 * | 7/2003 | Wiers | B60D 1/18 | 280/468 |
| 6,634,666 B2 | 10/2003 | Shilitz et al. | | |
| 6,824,156 B2 | 11/2004 | Smith | | |
| 6,974,146 B2 * | 12/2005 | Abair | B60D 1/246 | 280/470 |
| 7,651,114 B2 * | 1/2010 | Weber | B60D 1/36 | 254/419 |
| 8,091,913 B1 | 1/2012 | White | | |
| 2002/0089147 A1 * | 7/2002 | Shilitz | B60D 1/36 | 280/470 |
| 2003/0132605 A1 | 7/2003 | Wiers | | |
| 2003/0137126 A1 | 7/2003 | Reuter et al. | | |
| 2004/0021292 A1 | 2/2004 | Abair | | |
| 2010/0213687 A1 * | 8/2010 | McDaniel | B60D 1/06 | 280/491.2 |
| 2012/0112433 A1 | 5/2012 | Williams, Jr. et al. | | |

FOREIGN PATENT DOCUMENTS

| | | |
|---|---|---|
| FR | 2592339 A1 | 7/1987 |
| GB | 1217987 A | 1/1971 |
| WO | WO-2013085545 A2 | 6/2013 |

OTHER PUBLICATIONS

International Search Report in PCT/AU2015/050692 dated Dec. 21, 2015.

* cited by examiner

MOVABLE TOW BAR ASSEMBLY

CROSS-REFERENCE TO RELATED APPLICATIONS

This application is a continuation-in-part of International Application No. PCT/AU2015/050692 filed Nov. 5, 2015 which claims priority to Application No. AU 2014904485 filed Nov. 7, 2014, the disclosures of which are incorporated herein by reference in their entireties.

FIELD OF THE INVENTION

The invention relates to a movable tow bar assembly. In particular, the invention relates, but is not limited, to a tow bar which moves relative to a vehicle to provide a user with increased manoeuvrability and/or control.

BACKGROUND TO THE INVENTION

Reference to background art herein is not to be construed as an admission that such art constitutes common general knowledge.

Tow bars, also known as a tow or trailer hitch, are commonly used to connect a towing vehicle to a trailer, or the like. Typical standard tow bars used by consumers have an extension member with a tow ball. The tow ball can be received by a coupling on the trailer which securely connects the two together while allowing limited relative movement. Another towing attachment system uses a hook and ring and operates in a similar manner.

The driver of a towing vehicle can often find it difficult to manoeuvre a towed trailer. This is particularly the case when travelling in reverse, where the trailer precedes the driven vehicle. Notably, turning the driven vehicle in a particular direction results in the trailer tending towards the opposite direction. Even for experienced drivers this behaviour can present significant manoeuvrability challenges. This can reduce safety, increase time taken, increase frustration, and/or result in an accident that causes damage to the vehicle, trailer, environment, and/or injuries to nearby people.

SUMMARY OF INVENTION

In one aspect, the invention provides a movable tow-bar assembly comprising:

an elongate frame configured to be attached to a vehicle; and a towing attachment comprising a sleeve, the sleeve being shaped to receive a section of the elongate frame and allow translation of the towing attachment along a length of the frame;

a driving arrangement coupled with the sleeve and the frame for translational movement of the towing attachment along the length of the frame.

In an embodiment, the sleeve comprises a C-shaped member that is shaped to receive a section of the elongate frame in an internal space defined by the C-shaped member for supporting the towing attachment and allowing the towing attachment to translate along a length of the frame.

In an embodiment, end portions of the C-shaped member comprise opposed lips for preventing the sleeve from being detached from the frame when a towing force is applied to the sleeve in a transverse direction relative to the frame.

In an embodiment, the C shaped member comprises spaced apart plates to be arranged adjacently relative to opposed outer walls of the elongate frame, said spaced apart plates being connected by a transverse plate for defining the internal space therebetween to receive the section of the elongate frame. Preferably, the spaced apart plates and the transverse plate are welded to each other.

In an embodiment, the driving arrangement comprises a drive motor coupled to the sleeve for driving the towing attachment along the length of the frame.

In an embodiment, the drive motor transmits power to the sleeve by a worm gear coupled to the sleeve.

In an embodiment, the worm gear is disposed in an internal cavity defined by walls of the elongate frame, the worm gear extending between two opposed end portions of the elongate frame.

In an embodiment, the assembly comprises a sliding member positioned in a hollow elongate slot extending along the length of the elongate frame. The sliding member is configured to be fastened to the towing attachment thereby allowing movement of the towbar attachment along the length of the frame.

Preferably, the sliding member is coupled to the worm gear.

In an embodiment, the sliding member comprises a sliding block having a transversely extending worm gear connector.

In an embodiment, the invention further comprises a fastening arrangement including one or more fasteners for fastening the sleeve to the sliding member.

In an embodiment, the fastening arrangement comprises a plurality of bolt holes provided in the sliding member, said bolt holes extending in a transverse direction relative to the frame for receiving corresponding bolts therethrough and fastening the sleeve onto the sliding block positioned in the elongate slot. Preferably, the sliding member comprises two opposed walls wherein a first plurality of bolt holes is provided on a first of the opposed walls and a second plurality of opposed walls is provided on a second of the opposed walls.

In an embodiment, the opposed walls of the C-shaped member each comprise a respective plurality of bolt holes that correspond to the plurality of bolt holes of the sliding member for receiving said bolts and allowing the C-shaped member to be bolted to the sliding member during use.

In an embodiment, the tow-bar attachment further comprises an outwardly extending tongue portion to receive a tow-ball thereon, the tongue portion being preferably welded to the sleeve.

In an embodiment, a reinforcing member extends between an upstanding wall of the sleeve and the outwardly tongue portion.

In an embodiment, the assembly comprises a connector for attaching the elongate frame to a tow-bar receiving socket of the vehicle, the connector being positioned to be substantially equidistant from the opposed ends of the elongate frame.

In an embodiment, the assembly further comprises one or more gusset members extending between the elongate frame and the connector.

In an embodiment, the assembly further comprises a locking arrangement for locking the position of the towing attachment relative to the elongate frame at a pre-determined location.

Preferably, the locking arrangement comprises one or more locking pins adapted to be received into respective locking apertures provided along an outer wall of the elongate frame such that in a locked position, the locking pins are received in respective locking apertures to prevent movement of the towing attachment relative to the elongate frame.

In an embodiment, the assembly further comprises a control module coupled with the actuator, the control module comprising a user input interface for receiving user input and controlling the movement of the towing attachment relative to the elongate frame.

In an embodiment, the control module is arranged for wireless control of the drive motor.

In another aspect, the invention provides a movable tow bar comprising:
a frame configured to be mounted to a vehicle;
a towing attachment connected to the frame; and
an actuator coupled to the towing attachment;
wherein the towing attachment is movable relative to the frame and actuation of the actuator moves the towing attachment towards a side of the vehicle.

In another form, there is provided a movable tow bar comprising:
a frame configured to be mounted to a vehicle;
an extension member connected to the frame;
a towing attachment located on the extension member; and
an actuator coupled to the extension member such that the actuator can move the extension member relative to the frame.

Preferably the actuator moves the extension member in a substantially horizontal plane. Preferably the extension member rotates relative to the frame. Preferably the extension member rotates around a vertical axis. In a preferred form the extension member pivots around a pivot pin that connects the extension member to the frame. Preferably the extension member is an elongate member having a longitudinal axis. Preferably the longitudinal axis of the elongate member is located in the substantially horizontal plane.

The movable tow bar assembly may further comprise a locking assembly. The locking assembly preferably prevents movement between the frame and the towing attachment. In any embodiment the locking assembly prevents movement between the frame and the towing attachment by preventing movement between the frame and the extension member. In a preferred form the locking assembly comprises a locking pin. Preferably the locking pin is received in corresponding locking apertures of the frame and the extension member.

The actuator may comprise a hydraulic cylinder, a pneumatic cylinder, an electric motor, and/or a gearbox. In a preferred form the actuator comprises a hydraulic cylinder. Preferably the hydraulic cylinder is connected to the extension member. Preferably the actuator is powered. Preferably the actuator is configured to be powered by the vehicle.

Preferably the extension member has two opposed ends. Preferably the hydraulic cylinder is connected at or adjacent a first end. Preferably the towing attachment is located at or adjacent a second end. Preferably the extension member is connected to the frame, e.g. by a pivot pin, between the hydraulic cylinder connection and the towing attachment.

The movable tow bar assembly may further comprise a controller. Preferably the controller operates the actuator. The controller may signal the actuator wirelessly or, alternatively, the controller may signal the actuator electrically over wires or even mechanically. The controller preferably has an interface with controls that an operator can use to direct the actuator. Preferably the controller has one or more sensors and directs the actuator in response to measurements from the one or more sensors.

Preferably the towing attachment comprises a tow ball. Alternatively, the towing attachment may comprise a different type of towing attachment such as, for example, a tow ring. The towing attachment may be movable within a track of the extension member.

In an alternative embodiment, there may be no extension member and the towing attachment may be movable within a track of the frame. The track preferably comprises a channel. The channel may be any suitable shape but is preferably substantially linear. The channel preferably extends substantially perpendicularly to a towing axis. The towing attachment is preferably movable in the channel by an actuator. The actuator may comprise an electric motor. The actuator preferably converts rotational movement of the motor into non-rotational movement, such as linear movement. The actuator may comprise a worm drive.

In an alternative embodiment, the towing attachment may be movable across a rail. Preferably the rail is substantially cylindrical. Preferably the towing attachment is mounted to a sleeve. Preferably the sleeve has a channel that corresponds to the shape of the rail. Preferably the sleeve is slidably mounted on the rail. Preferably the sleeve substantially surrounds a portion of the rail. Preferably the sleeve is movably connected to the rail via a fluid actuated cylinder.

Preferably the frame comprises a hollow member. Preferably the hollow member comprises a rectangular hollow section (RHS). Preferably the actuator comprises a hydraulic cylinder and the hollow member of the frame contains a hydraulic reservoir and/or a hydraulic pump.

In another form, there is provided a method of manoeuvring a trailer connected to a movable tow bar of a vehicle, the method comprising the steps of:
operating a controller;
actuating an actuator according to operation of the controller; and
moving a towing attachment, to which the trailer is connected, with the actuator;
wherein the towing attachment is moved towards a side of the vehicle.

Preferably the movable tow bar assembly is mounted to a rear end of the vehicle and the controller is operated from inside the vehicle. Preferably the controller is operated by a user of the vehicle. Preferably the towing attachment is moved in a substantially horizontal plane by the actuator. In a preferred form the towing attachment is moved substantially perpendicularly to a towing axis. Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
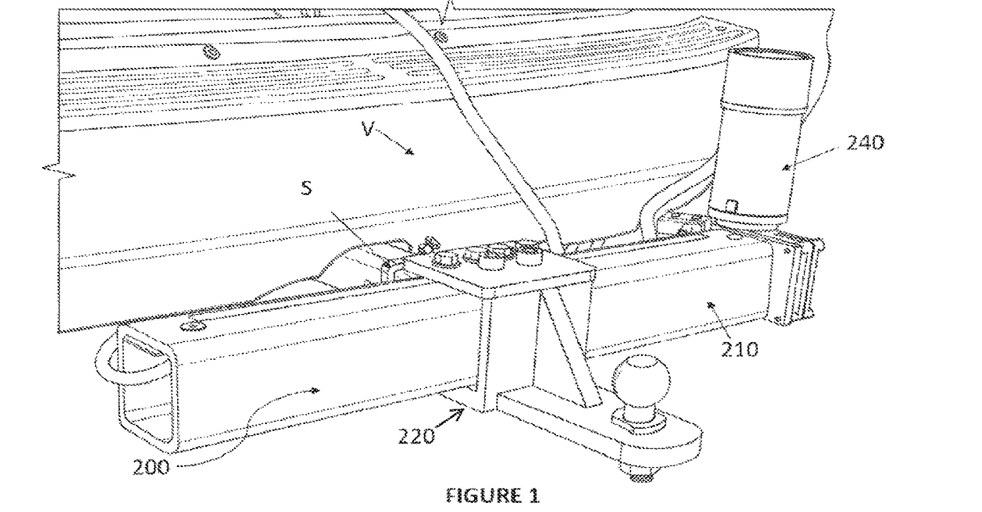
FIG. 1 illustrates a first frontal perspective view of a movable tow-bar assembly 200 in accordance with an embodiment of the invention.
Figure 2:
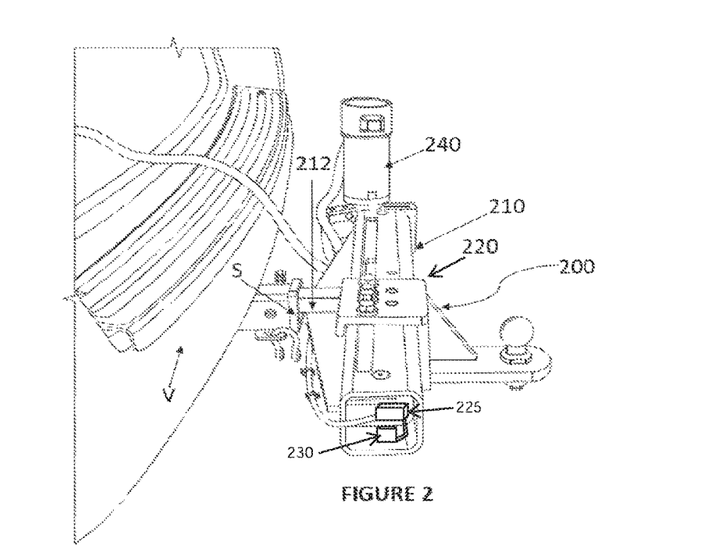
FIG. 2 illustrates a side perspective view of the movable tow-bar assembly 200.
Figure 3:
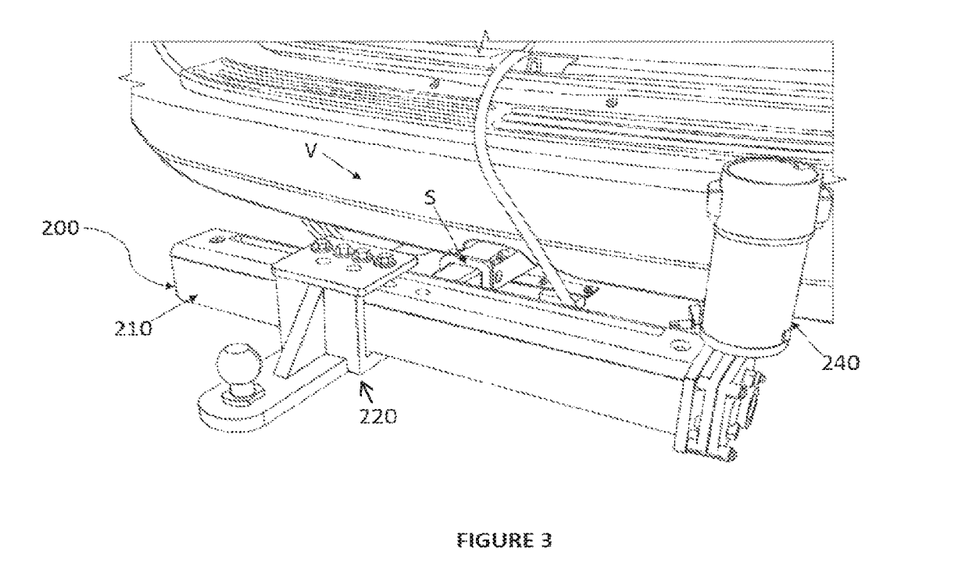
FIG. 3 illustrates a second frontal perspective view of a movable tow-bar assembly 200.
Figure 4:
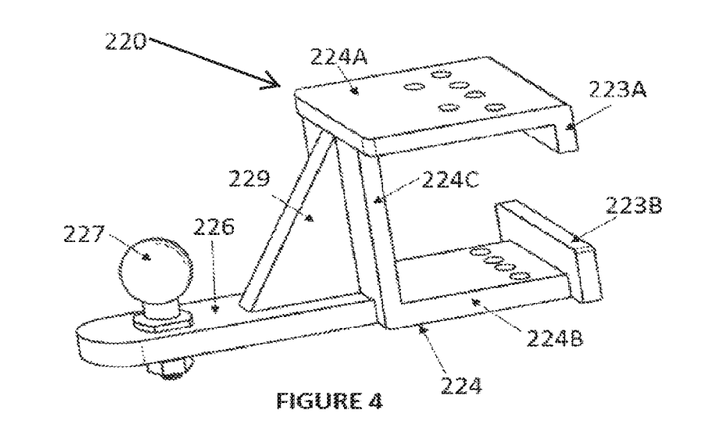
FIG. 4 illustrates a side view of the towing attachment 220.
Figure 5:
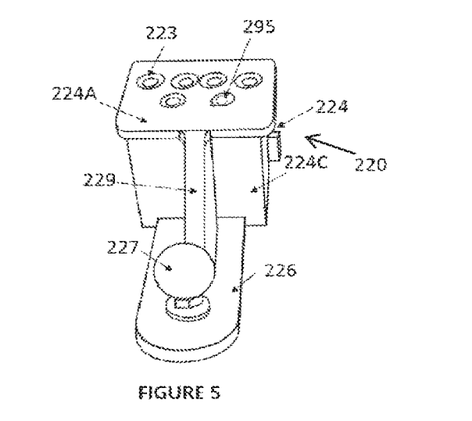
FIG. 5 illustrates a top perspective view of the towing attachment 220 which forms a part of the tow bar assembly 200.
Figure 6:
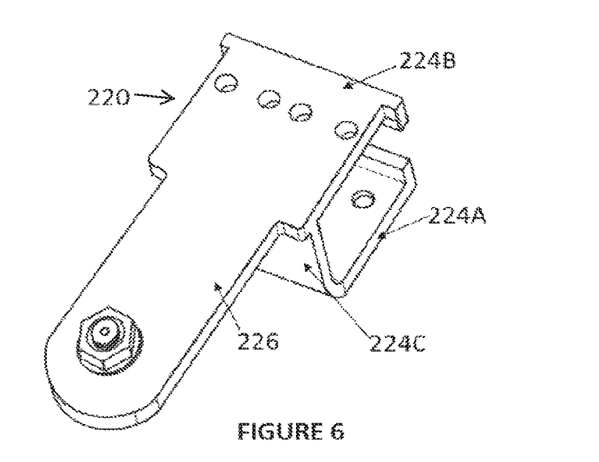
FIG. 6 illustrates a bottom perspective view of the towing attachment 220.
Figure 7:
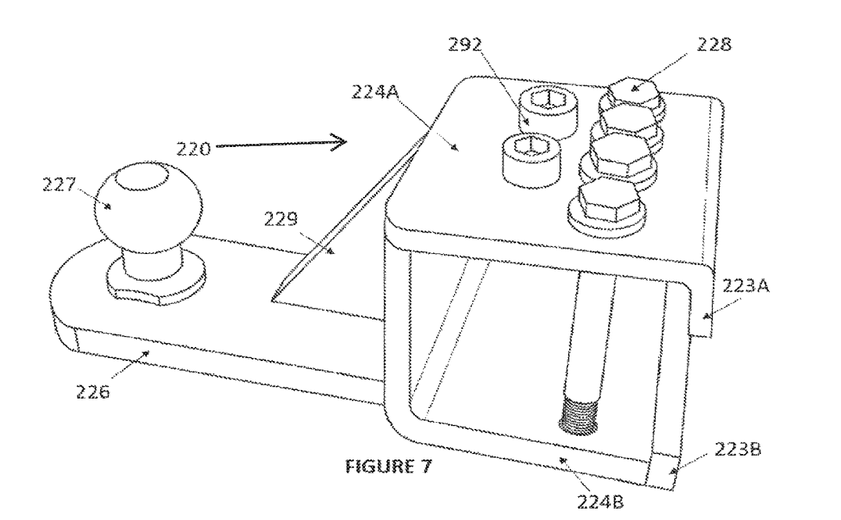
FIG. 7 illustrates a side-perspective view of the towing attachment 220.
Figure 8:
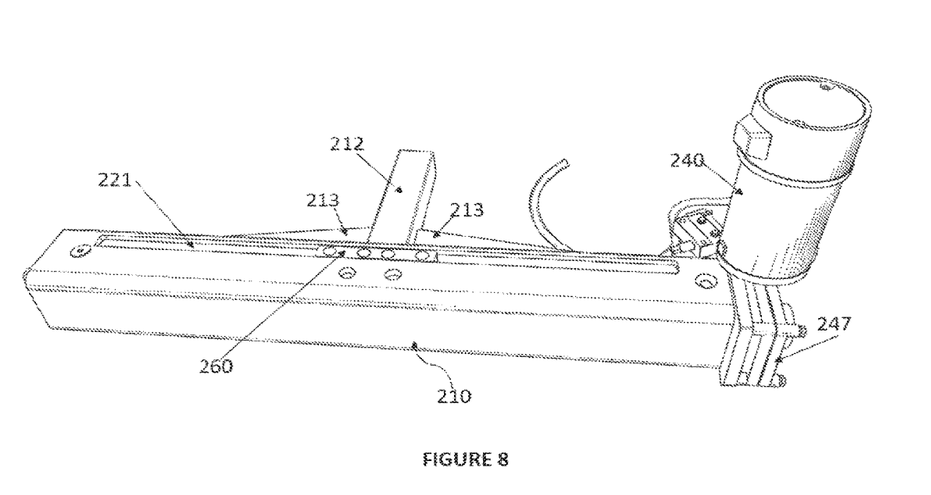
FIG. 8 is a first top perspective view of an elongate frame 210 which forms a part of the towbar assembly 200.
Figure 9:
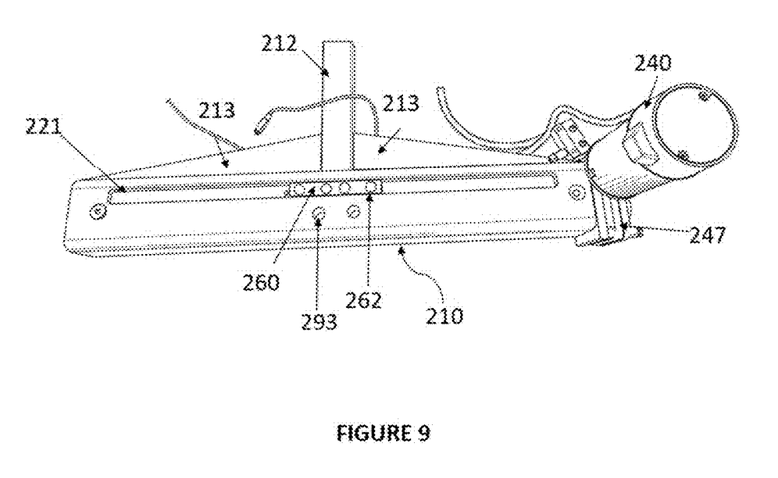
FIG. 9 is a top view of the elongate frame 210.
Figure 10:
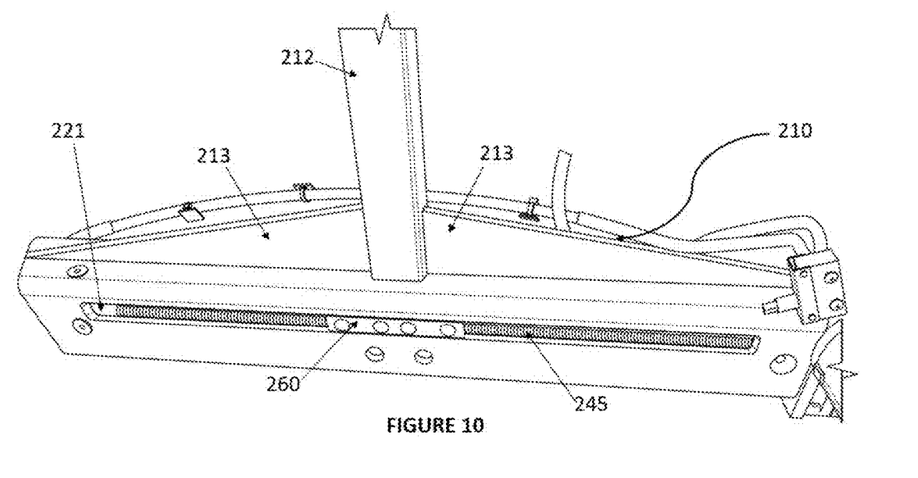
FIG. 10 is an enlarged top view of the elongate frame 210.
Figure 11:
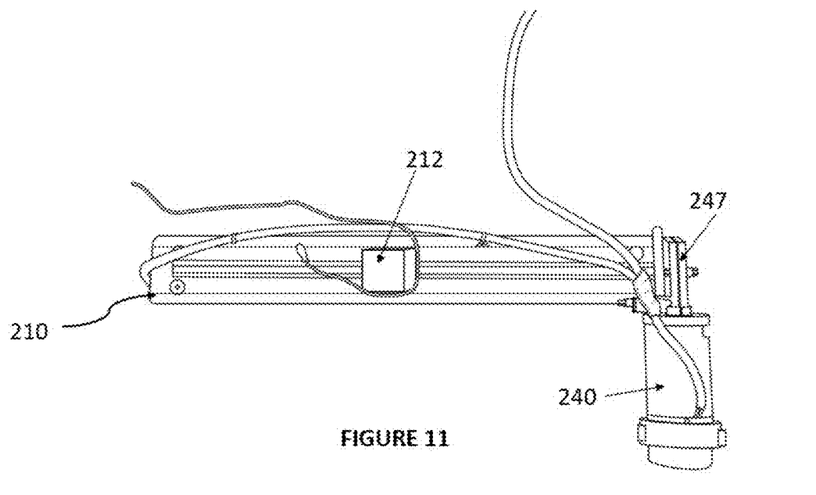
FIG. 11 is a rear view of the elongate frame 210.

FIGS. 1 to 3 illustrate the tow bar assembly 200 in an installed position whereby the tow-bar assembly 200 has been installed on a vehicle V. Specifically, the tow-bar assembly 200 comprises a tubular elongate frame 210 which is attached to a tow-bar receiving socket (S) of the vehicle V such that the elongate frame 210 extends in lateral direction relative to a direction of motion of the vehicle V. The elongate frame 210 includes a connector 212 that is welded to an outer wall of the elongate frame 210 and extends in a generally perpendicular direction from the main body of the elongate frame 210. The connector 212 is provided in the form of a square shaped tube that is configured for being received into the socket S having a complementary configuration. The socket S may take the form of a conventional tow-bar socket which is typically coupled with the chassis of the vehicle V. A securing arrangement for securing the connector 212 within the socket S may also be provided to prevent the connector 212 (and the elongate frame 210) from inadvertently becoming uncoupled from the socket S during use. Substantially triangular gusset members 213 (shown in FIGS. 8 to 10) are also welded to the walls of the connector 212 and the rear wall of the elongate frame 210 for reinforcing the welded connection between the connector 212 and the elongate frame 210.

The tow-bar assembly 200 also comprises a movable towing attachment 220 which is configured to slide along a length of the elongate frame 210. Referring to FIGS. 4 to 7, the towing attachment 220 comprises a C-shaped sleeve member 224 that is shaped to receive a section of the elongate frame in an internal space defined by the C-shaped member 224. The C shaped member 224 comprises spaced apart and mutually opposed plates 224A and 224B which are spaced apart and welded to a transversely arranged connecting plate 224C so that during use inner walls of the spaced apart plates 224A and 224B can be arranged adjacently relative to opposed outer walls of the elongate frame 210 in order to support the towing attachment 220 and allow the towing attachment 220 to translate over the length of the elongate frame 210. The spaced apart plates 224A and 224B include corresponding lip portions 223A and 223B that are provided in a mutually opposed configuration to prevent the towing attachment 220 from being detached from the elongate frame 210 when a towing force is applied in a transverse direction relative to the elongate frame 210.

The towing attachment 220 also includes an outwardly extending tongue portion 226 that allows a tow ball 227 to be mounted thereon. A reinforcing member 229 extending between the tongue portion 227 and the transverse connecting plate 224C is provided for reinforcing the welded connection between the tongue 226 and the C-shaped sleeve member 224. In the presently described embodiment, the outwardly extending tongue portion 226 is welded onto the transverse connecting plate 224C to be substantially in alignment with one of said spaced apart plates 224A and 224B. Such a configuration of the towing attachment 220 allows the towing attachment to be inverted and positioned along the fixed elongate frame 210 in order to vary the height of the tongue portion (which supports the tow ball 227). Specifically, in a first in-use configuration, the tongue portion 226 is positioned at a higher elevation relative to the supporting surface for the vehicle. In a second in-use configuration, the tongue portion 226 is positioned at a relatively lower elevation. In further improvements, the tongue portion 226 may be modified to allow the position of the tongue portion 226 to be movably adjusted along various mounting locations along the transverse connecting plate 224C without departing from the spirit and scope of the invention. It is important to note that after the towing attachment 220 is inverted, the towball 227 needs to be uncoupled from the tongue portion 226 (preferably by using a fastening nut of the towball) and re-positioned so that the towball 227 is mounted on the tongue portion 226 in an upwardly facing configuration.

Figure 12:
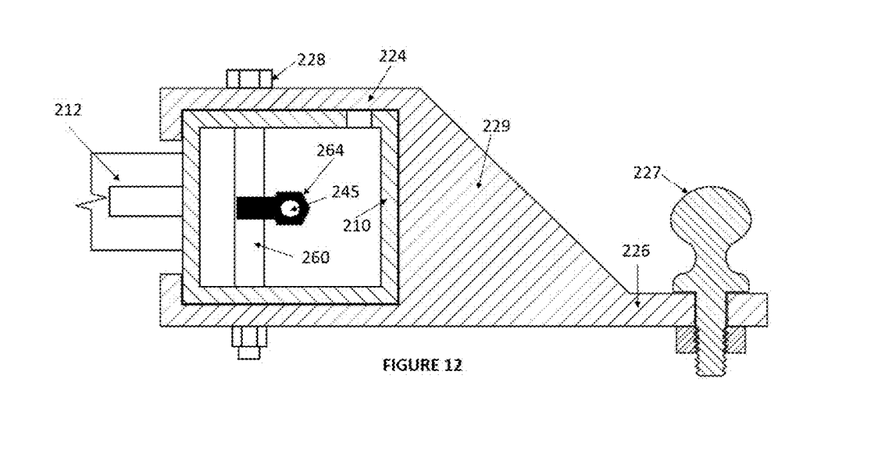
FIG. 12 is a sectional view of the movable tow-bar assembly 200.
Figure 12A:
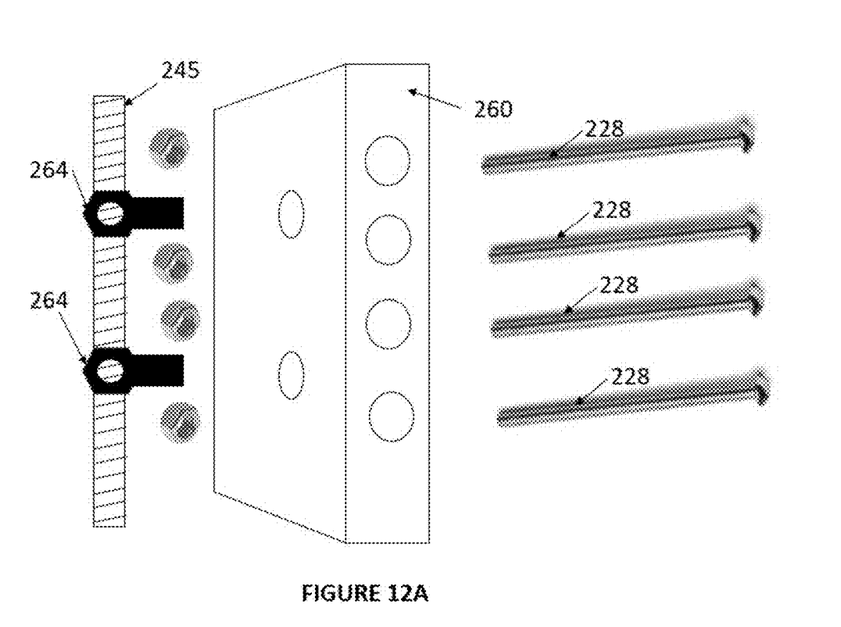
FIG. 12A is a perspective view of the sliding block 260 that forms a part of the tow bar assembly 200.

The towing attachment 220 is removably fastened to a sliding block 260 (clearly visible in FIGS. 8 to 10) that is positioned within an internal cavity defined by the walls of the elongate frame 210. During use, the spaced apart plates 224A and 224B of the C-shaped member 224 are bolted onto the sliding block 260. Specifically, the sliding block 260 is provided with bolt holes 262 that extend in a transverse direction relative to the elongate frame 210 and correspond with bolt holes 223 provided along each of the spaced apart plates 224A and 224B. Fastening bolts 228 (visible in FIGS. 7 and 12A) are provided for fastening the towing attachment 220 with the sliding block 260 which in turn allows the towing attachment 220 to slide along the elongate frame 210 whilst being attached to the sliding block 260. The provision of the fastening bolts 228 also allows the bolts 228 to be removed in order to remove the towing attachment 220 relatively easily by sliding the towing attachment out of the elongate frame 210.

The sliding block 260 that is positioned within the housing of the elongate frame 210 is driven by a drive motor 240. A top portion and a bottom portion of the sliding block 260 is accessible from an elongate slot 221 that is provided along a top and bottom wall of the elongate frame 210. The provision of the elongate slot along each of the top and bottom wall of the elongate frame 210 allows the spaced apart plates 224A and 224B to be fastened onto the top and bottom portions of the sliding block 260 and allows the towing attachment 220 to be fastened onto the sliding block 260. The sliding block 260, when bolted to the towing attachment 220, allows power to be transmitted from the drive motor to the towing attachment 220. A worm gear drive 245 (shown clearly in FIG. 10) is coupled with the drive motor 240 for driving the sliding block 260 (which is fastened to the towing attachment 220). Hexagonal nuts 264

(FIGS. 12 and 12A) are provided for transferring drive from the worm gear drive 245 to the sliding block 260. The hexagonal head portion of the nuts 264 include an opening for threadedly receiving the worm gear drive 245 (best shown in FIGS. 12 and 12A). The shank portion of the nut 264 is fastened onto a side wall of the sliding block 260 (shown clearly in FIG. 12). Consequently, during use, any movement of the worm gear 245 results in translation of the sliding block 260 along the length of an elongate cavity defined by the walls of the elongate frame 210. The towing attachment 220, when fastened to the sliding block 260 also moves along a length of the elongate frame 210.

The motor 240 may be controllable by, for instance, a controller mounted along the elongate frame 210 which may include conventional switches and/or buttons, as known by one of ordinary skill in the art. Alternatively, a plug receptacle could be replaced with a receiver of electromagnetic signals (not shown), and controller could be replaced with a remote control (not shown) that emits electromagnetic signals for controlling the motor 240.

The towing assembly 200 also includes a bracket assembly provided within the elongate frame 210 for mounting the worm gear drive 245 within the internal space defined by the walls of the tubular elongate frame 210 such that the worm gear 245 extends between two lateral ends of the elongate frame 210. Plate guides and bearing plates 247 may be provided at either lateral end of the housing defined by the walls of the elongate frame 210 for supporting the worm gear 245. The plates and bearing for positioning the worm gear 245 may be used with any suitable fasteners, such as bolts, to permit disassembly and service of internal components, or may be permanently affixed within the elongate frame 210 via welding, etc., where disassembly is not required.

A locking arrangement is also provided for optionally locking the position of the towing attachment 220 relative to the elongate frame 210 at a substantially central location relative to the elongate frame 210. Specifically, two locking pins 292 (shown in FIG. 7) are adapted to be received into respective locking apertures (shown in FIGS. 9 and 10) provided along an outer top wall of the elongate frame 210 and corresponding locking apertures 295 (shown in FIG. 5) positioned along the spaced apart plate 224A (or 224B). In a locked position, the locking pins 292 are received in the respective locking apertures 293 and 295 provided in the elongate frame 220 and the attachment member 220 and prevent movement of the towing attachment 220 relative to the elongate frame 210.

Figure 13:
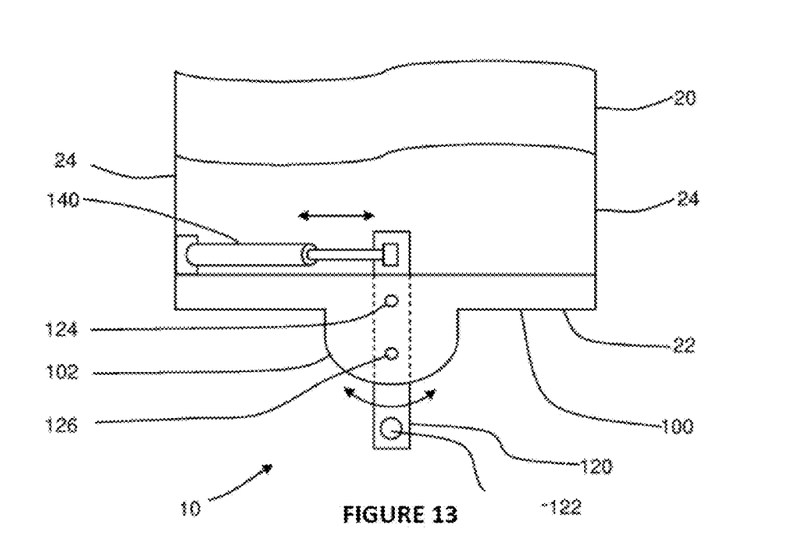
FIG. 13 illustrates a diagrammatic plan view of a movable tow bar assembly 10 according to a second embodiment.

Advantageously, the configuration of the towing attachment 220 in combination with the elongate frame 210 in combination with the driving arrangement allows the towbar assembly to function like a normal tow bar during usual towing. However, the driving arrangement (including the drive motor 240 in combination with the worm gear 245 and the sliding block 260 fastened to the towing attachment 220) allows translational movement of the towing attachment 220 along a length of the elongate frame 210. The provision of the aforementioned configuration provides additional control over a towed vehicle during difficult manoeuvres, such as when reversing the vehicle V. The additional control over the towed vehicle improves safety by reducing the likelihood of the towed vehicle having a collision with either the environment or bystanders. The movable towbar assembly 200 further provides additional convenience and efficiency during difficult towing manoeuvres. FIG. 13 illustrates a movable tow bar assembly 10, in accordance with a second embodiment, mounted to a vehicle 20 having a rear end 22 and two opposed sides 24. The movable tow bar assembly 10 has a frame 100 mounted to the rear of the vehicle 20 and an extension member 120 connected to the frame 100. The frame 100 is preferably rigidly affixed to a chassis of the vehicle 20 with a support plate 102 adjacent the extension member 120. In a preferred form a pair of support plates 102 are provided. The pair of support plates 102 are preferably aligned in spaced apart parallel planes with the extension member 120 being received between the two support plates 102. The extension member 120 has a towing attachment, in the form of a tow ball 122, at an end that is distal from the vehicle 20. In the illustrated embodiment the extension member 120 is connected to the frame 100 by a pivot pin 124. The extension member 120 also has a locking assembly in the form of a removable locking pin 126 the also connects the extension member 120 to the frame 100. The pivot pin 124 and locking pin 126 are both receivable in respective apertures in the frame 100 and the extension member 120.

The extension member 120 is also coupled to an actuator in the form of a hydraulic cylinder 140. The hydraulic cylinder 140 is connected substantially perpendicularly to a longitudinal axis of the extension member 120 such that extension and retraction of the hydraulic cylinder 140 causes the extension member to pivot around the pivot pin 124 when the locking assembly is unlocked, e.g. when the locking pin 126 is removed from the extension member 120 and/or frame 100.

Figure 14:
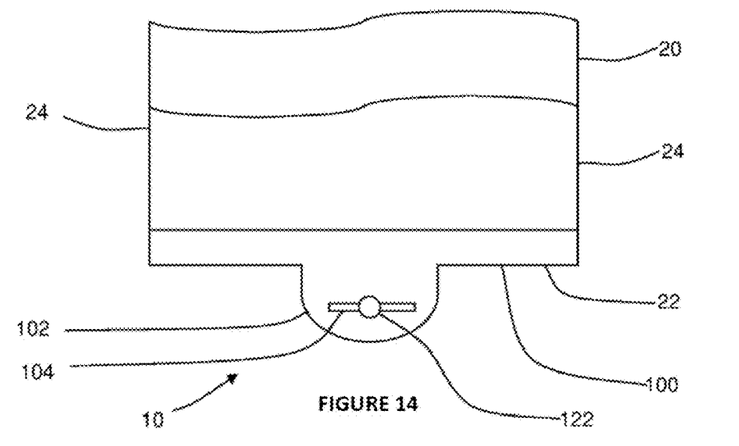
FIG. 14 illustrates a diagrammatic plan view of the movable tow bar assembly of an alternative embodiment.

FIG. 14 illustrates an alternative embodiment of a movable tow bar 10 wherein the tow ball 122 is movable within a rail in the form of a channel 104 in the frame 100. The channel 104 is substantially linear with a longitudinal axis substantially perpendicular to a towing axis. The actuator (not shown in FIG. 14) for this arrangement preferably includes an electric motor and gearbox. A worm drive may also be utilised. Although a straight channel 104 is illustrated in FIG. 14 it will be appreciated that the channel could take other forms such as, for example, a curved channel.

Figure 15:
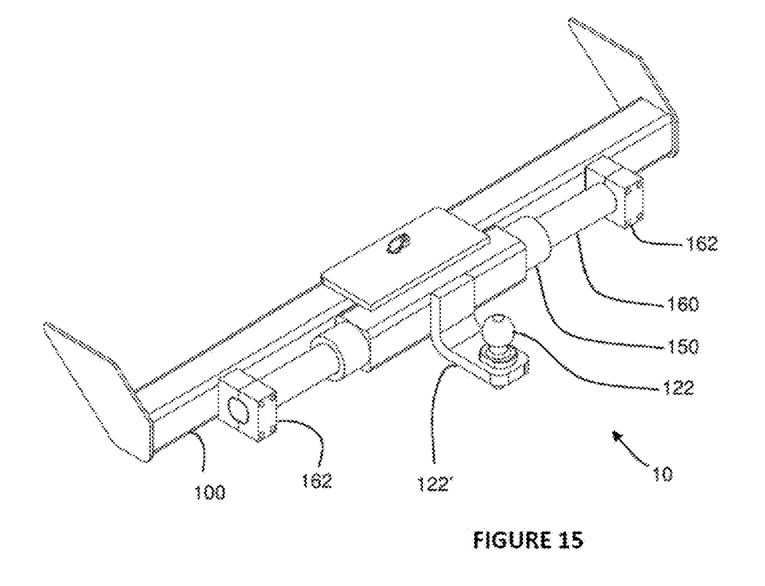
FIG. 15 illustrates a perspective view of a movable tow bar assembly of another embodiment.
Figure 16:
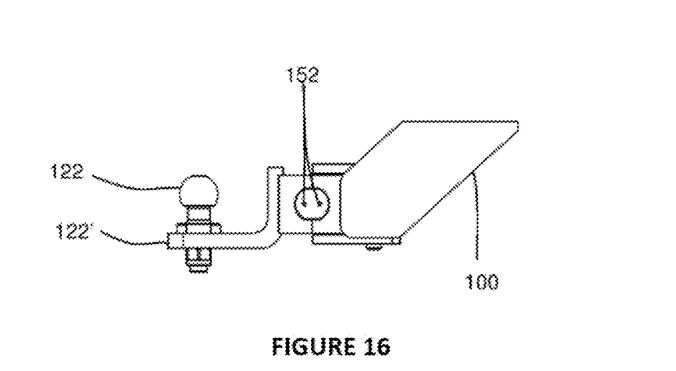
FIG. 16 illustrates a side view of the movable tow bar assembly of the embodiment shown in FIG. 15.
Figure 17:
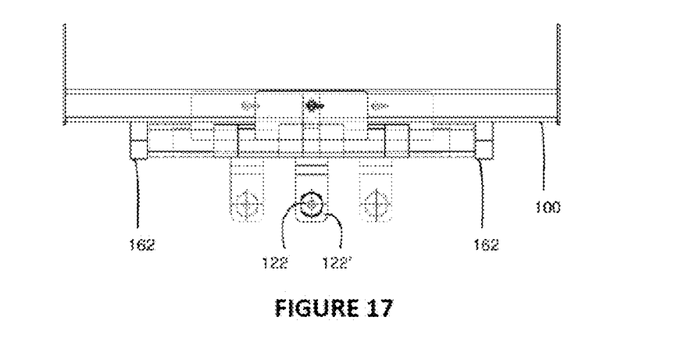
FIG. 17 illustrates a top plan view of the movable tow bar assembly illustrated in FIG. 15 in various different positions.

FIGS. 15 to 17 illustrate an alternative embodiment of a movable tow bar assembly 10 wherein the tow ball 122 is located on a sleeve 150 via bracket 122'. The sleeve 150 is slidably mounted to a rail 160. In the illustrated embodiment the rail 160 is substantially cylindrical, with the sleeve 150 having a correspondingly shaped substantially cylindrical opening of channel running therethrough. The rail 160 is contained between two end stops 162. The sleeve 150 can slide along the rail between the end stops 162 as illustrated in FIG. 17.

The sleeve is connected to one end of a concealed hydraulic cylinder (not shown) and the rail is connected to another end of the hydraulic cylinder. As seen in FIG. 16, hydraulic ports 152 are provided to control the hydraulic cylinder. The hydraulic ports 152 can be utilised to connect the hydraulic cylinder to a hydraulic reservoir 230 and pump 225. In a preferred embodiment, the reservoir 230 and pump 225 are contained inside the frame 100 as seen in FIG. 2.

In use, the movable tow bar assembly 10 of FIG. 13 may be used like a normal tow bar with the extension member 120 locked such that its longitudinal axis substantially coincides with the longitudinal axis of the vehicle 20. When additional manoeuvrability is required, such as when reversing the vehicle 20 with a towed vehicle such as a trailer attached to the tow ball 122, additional control over the towed vehicle may be obtained by removing the locking pin 126 and actuating the hydraulic cylinder 140.

The hydraulic cylinder 140 is preferably controlled from a cabin of the vehicle 20, to enable a user to pivot the extension member 120 with tow-ball 122 thereon towards either the left or right side of the vehicle. The pivot movement will also bring the tow ball 122 closer to a rear of the vehicle 20. As the tow ball 122 is moved the angle between the vehicle 20 and the towed vehicle is altered. This change in angle can be used to the driver's advantage to direct the towed vehicle in a particular direction to achieve a desired path for the towed vehicle to travel.

The movable tow bar assembly 10 of FIG. 14 is operated in a similar manner, with the tow ball 122 being movable with respect to the frame 100 and hence the vehicle 20. As the tow ball 122 is moved in the channel 104, the angle between the vehicle 20 and the towed vehicle is altered and, again, can be used to the driver's advantage to direct the towed vehicle in a particular direction to achieve a desired path for the towed vehicle to travel. The movable tow bar assembly 10 of FIGS. 15 to 17 is operated in a similar manner, with the tow ball 122 being movable with respect to the frame 100 and hence the vehicle 20 by sliding the sleeve 150 across the rail 160. As a controller is operated, manually or automatically, the hydraulic cylinder slides the sleeve 150 longitudinally along the rail 160 to move the tow ball 122 towards a side of the vehicle to which the movable tow bar 10 is mounted.

Advantageously, the movable tow bar assembly 10 operates like a normal tow bar during usual towing, but allows the tow ball 122 of the tow bar 10 to be moved when desired. This provides additional control over a towed vehicle during difficult manoeuvres, such as when reversing the vehicle 20. The additional control over the towed vehicle can vastly improve safety by reducing the likelihood of the towed vehicle having a collision with either the environment or bystanders. The movable towbar assembly 10 further provides additional convenience and efficiency during difficult towing manoeuvres.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A movable tow-bar assembly comprising:
    an elongate frame configured to be attached to a tow-bar receiving socket of a vehicle;
    a towing attachment positioned on a sleeve, the sleeve being shaped to receive a section of the elongate frame and allow translation of the towing attachment horizontally along a length of the elongate frame;
    a sliding member positioned in a hollow slot extending along the length of the elongate frame, wherein:
        the sliding member is configured to be removably fastened to the sleeve, and
        the elongate frame defines a central cavity having a first width, measured in a direction extending perpendicular to the length of the elongate frame,
        the hollow slot has a second width, measured in the direction extending perpendicular to the length of the elongate frame,
        the first width is different than the second width, and
        a sidewall of the sliding member abuts a sidewall of the elongate frame defining the hollow slot;
    a driving arrangement coupled with the sleeve and the elongate frame for effecting translational movement of the towing attachment along the length of the elongate frame; and
    a fastening arrangement including one or more fasteners for fastening the sleeve to the sliding member, wherein the fastening arrangement comprises a plurality of bolt holes provided in the sliding member and a plurality of bolts, the plurality of bolt holes extending in a transverse direction relative to the length of the elongate frame for receiving the plurality of bolts therethrough and fastening the sleeve onto the sliding member positioned in the hollow slot.

2. The movable tow-bar assembly of claim 1, wherein the sleeve comprises a C-shaped member that is shaped to receive the section of the elongate frame in an internal space defined by the C-shaped member for supporting the towing attachment and allowing the towing attachment to slide along the length of the elongate frame.

3. The movable tow-bar assembly of claim 2, wherein end portions of the C-shaped member comprise opposed lips for preventing the sleeve from being detached from the elongate frame when a towing force is applied in a transverse direction relative to the length of the elongate frame.

4. The movable tow-bar assembly of claim 2, wherein the C-shaped member comprises spaced apart plates arranged contiguously relative to opposed outer walls of the elongate frame, the spaced apart plates being connected by a transverse plate for defining the internal space therebetween to receive the section of the elongate frame.

5. The movable tow-bar assembly of claim 4, wherein the spaced apart plates and the transverse plate are welded to each other.

6. The movable tow-bar assembly of claim 1, further comprising a drive motor for driving the towing attachment along the length of the elongate frame.

7. The movable tow-bar assembly of claim 6, wherein the drive motor drives the towing attachment by a worm gear coupled to the sleeve.

8. The movable tow-bar assembly of claim 7, wherein the worm gear is disposed in the central cavity defined by walls of the elongate frame, the worm gear extending between two opposed end portions of the elongate frame.

9. The movable tow-bar assembly of claim 1, further comprising a drive motor for driving the towing attachment along the length of the elongate frame, wherein the sliding member is coupled to a worm gear to transfer drive from the worm gear to the sliding member.

10. The movable tow-bar assembly of claim 1, wherein the sliding member comprises a sliding block.

11. The movable tow-bar assembly of claim 1, wherein opposed walls of the sleeve comprise a plurality of bolt holes that correspond to the plurality of bolt holes provided in the sliding member for receiving the plurality of bolts therethrough and allowing the sleeve to be bolted to the sliding member during use.

12. The movable tow-bar assembly of claim 1, wherein the towing attachment further comprises an outwardly extending tongue portion to receive a tow-ball thereon.

13. The movable tow-bar assembly of claim 12, wherein the outwardly extending tongue portion is welded to the sleeve.

14. The movable tow-bar assembly of claim 1, further comprising a connector for attaching the elongate frame to the tow-bar receiving socket of the vehicle, the connector being positioned to be substantially equidistant from opposed ends of the elongate frame.

15. The movable tow-bar assembly of claim 1, further comprising a locking arrangement for locking a position of the towing attachment relative to the elongate frame at a pre-determined location, wherein the locking arrangement comprises one or more locking pins adapted to be received into respective locking apertures provided along an outer wall of the elongate frame such that, in a locked position, the one or more locking pins are received in respective locking apertures to prevent movement of the towing attachment relative to the elongate frame.

16. The movable tow-bar assembly of claim 1, further comprising a locking arrangement for locking a position of the towing attachment relative to the elongate frame at a pre-determined location, wherein the locking arrangement comprises one or more locking pins adapted to be received into respective locking apertures extending through an outer wall of the elongate frame.

17. The movable tow-bar assembly of claim 1, wherein a top surface of the sliding member is co-planar with a top surface of the elongate frame.

18. The movable tow-bar assembly of claim 1, wherein:
the sliding member has a third width, and
the third width is less than the second width such that the sliding member is receivable within the hollow slot.

19. The movable tow-bar assembly of claim 1, wherein the first width is greater than the second width.

* * * * *